Oct. 6, 1942.  H. J. LUFF  2,297,967
BAFFLED RESEALING TRAP FOR PLUMBING FIXTURES
Filed Sept. 22, 1941

INVENTOR.
Henry J. Luff
BY
Florian G. Miller
ATTORNEY.

Patented Oct. 6, 1942

2,297,967

UNITED STATES PATENT OFFICE 2,297,967

BAFFLED RESEALING TRAP FOR PLUMBING FIXTURES

Henry J. Luff, Cleveland, Ohio, assignor to J. A. Zurn Manufacturing Company, Erie, Pa., a corporation of Pennsylvania Application September 22, 1941, Serial No. 411,882

5 Claims. (Cl. 182—7)

This invention relates generally to traps, and more particularly to improvements in resealing traps for use under any fixture from which the discharge enters directly or indirectly into a building sewer or building drain.

All devices of this character made according to the prior art, and with which I am familiar, have used many forms of anti-siphon traps to prevent complete trap siphoning in which baffle plates, secret partitions, deflectors, stand-pipes, and impractical enlargement of the out-leg and depth of the seal have been used, but these have retarded the natural outflow of the waste, thus preventing self-scouring efficiency. The baffles used in prior devices were so arranged that there was great difficulty in cleaning the trap and in many cases, it was impossible to do so. These prior devices likewise gathered hair and lint on the rough sides thereof in such a manner as to produce capillary attraction of the liquid and consequent siphonage of the trap seal. Also, the solids retained created a foul odor in the trap.

It is, accordingly, an object of my invention to overcome the above and other defects in resealing traps, and it is more particularly an object of my invention to provide a resealing trap which is simple in construction, economical in manufacture, easy to install, and economical in cost.

Another object of my invention is to provide a resealing trap having a minimum height to provide for installation thereof in a limited space.

Another object of my invention is to provide a resealing trap wherein a baffle is attached to the cleanout plug.

Another object of my invention is to provide a self-scouring resealing trap.

Another object of my invention is to provide a resealing trap which prevents siphonage of the liquids therein.

Other objects of my invention will become evident from the following detailed description taken in conjunction with the accompanying drawing in which.

Figure 1:
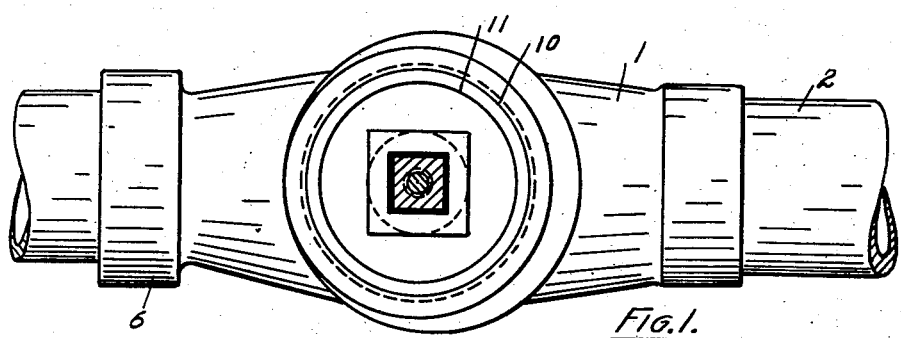
Fig. 1 is a top plan view of my novel resealing trap.
Figure 2:
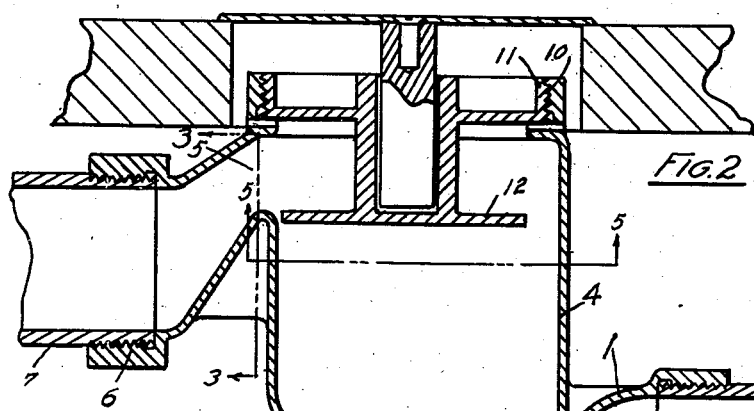
Fig. 2 is a side cross-sectional view of my novel resealing trap.
Figure 3:
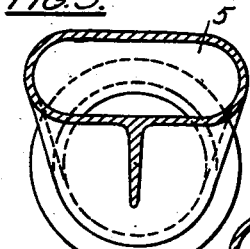
Fig. 3 is a view taken on the line 3—3 of Fig. 2.
Figure 4:
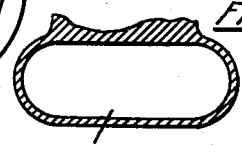
Fig. 4 is a view taken on the line 4—4 of Fig. 2.
Figure 5:
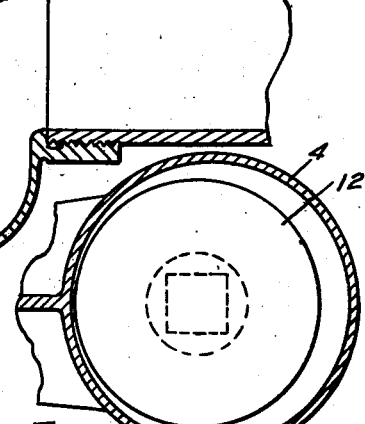
Figure 5 is a view taken on the line 5—5 of Figure 2.

Referring to the drawing, Figs. 1 and 2 show the inflow leg 1 of the trap which may be connected by any suitable connection to a drain pipe 2 from a fixture (not shown). The flattened inlet opening 3 leads into the lower portion of the body 4 of the trap. A flattened discharge opening 5 in the upper part of the body 4 of the trap leads to a discharge leg 6 which in turn is connected to a sewer or a drain line 7 by any suitable connection. The flattened inlet and outlet openings 5 and 6 in the body 4 of the trap have the same area as the inner threaded openings 8 and 9 in the inflow leg 1 and the outflow leg 6, respectively. A cleanout opening 10 is formed in the upper part of the body 4 of the trap and a cleanout plug 11 is threadably disposed therein. A baffle 12 depends from the cleanout plug 11 into the central portion of the body 4 of the trap and the outer side thereof is spaced a predetermined distance from the inner side of the body 4 of the trap. The baffle 12 depends to a position in a horizontal line with the lower portion of the outlet opening 5 in the upper portion of the body 4 of the trap. The baffle 12 is disposed off-center with respect to the body 11 in order that the distance between the side of the baffle 12 adjacent the outlet opening 5 may be constricted to such an extent that siphonage is reduced to a minimum. The bottom portion of the body 4 of the trap is tapered at 13 to permit the free flow of fluid through the trap. The area between the outer side of the baffle 12 and the inner side of the body 4 of the trap is preferably substantially equal to the area of the inlet and outlet openings 3 and 4 although this is not absolutely necessary for efficient operation. The inlet and outlet openings 3 and 4 are flattened to decrease the height of the trap to permit the installation thereof in a limited space. It is ordinarily required to install these traps in areas having a limited height, and it is, therefore, very desirable to have a trap of minimum height with a maximum height of seal. The inlet and outlet drain lines 2 and 7 are so disposed that they will clear one another when in a horizontal plane. Seepage holes are disposed around the cleanout opening to indicate the full closing of the cleanout plug.

In operation, drainage water enters the trap from the drain line 2 through the inflow leg 1 and the inlet opening 3 in the bottom of the body 4 of the trap. The water is forced through the body of the trap 4 around the side of the baffle 12 outwardly through the outlet opening 5 to the sewer or drain line 7. A maximum depth of reseal will be maintained because the baffle prevents the water from being siphoned from the body 4 of the trap. Inspection and cleaning are readily effected by removing the cleanout plug 11, thereby removing the baffle 12. Because of the roughness of the inside of the castings, it will be quite evident that the sides of the trap pick up considerable lint and other matter, thereby producing capillary attraction of the liquid, and consequent siphonage of the trap seal. This lint and other matter can be easily removed because of the location of the cleanout opening 11. The lower portion of the cleanout plug 11 is in substantially the same plane with the top of the outlet opening 5, thereby deleting any recess and permitting self-scouring of the trap.

It will be evident from the foregoing description that I have provided a resealing trap which has a maximum height of reseal with a minimum outside height for installation in an area of restricted height.

Various changes may be made in the specific embodiment of the present invention without departing from the spirit thereof or from the scope of the appended claims.

What I claim is:

1. A resealing trap for the discharge line of plumbing fixtures comprising a tapered cylindrical body portion having a flattened inlet opening in the base thereof opposite to said tapered portion and a flattened outlet opening in the upper portion thereof and a cleanout opening, and a cleanout plug disposed in said cleanout opening having a depending flange with the outer side thereof spaced from the inner side of said body and in substantially the same horizontal plane as the bottom portion of said outlet.

2. A self-scouring resealing trap for the discharge lines of plumbing fixtures comprising a body portion having a flattened inlet in the bottom portion thereof and a flattened outlet in the top portion thereof and a cleanout opening, inflow and outflow legs leading from said body portion, said inlet and said outlet openings receding into cylindrical portions of the same diameter as said inlet and outlet openings, a cleanout plug in said cleanout opening having the bottom portion thereof flush with the top of said outlet opening and having a depending flange with the outer side thereof spaced from the inner side of said body and in substantially the same horizontal plane with the bottom of said outlet opening.

3. A resealing trap for the discharge line of plumbing fixtures, having a body portion with an inlet in the lower portion thereof and an outlet in the upper portion thereof and a clean-out opening in the upper portion thereof; and a clean-out plug having a spaced, disc-shaped, depending flange in said clean-out opening, said depending flange retarding the flow of water through the body portion of said trap to said outlet opening.

4. A resealing trap for the discharge line of plumbing fixtures, comprising a body portion having an inlet and an outlet and a clean-out opening; and a clean-out plug disposed in said clean-out opening, having a spaced, disc-shaped, depending flange spaced from the inner side of said body portion and in substantially the same horizontal plane as the bottom of said outlet opening.

5. A resealing trap for the discharge lines of plumbing fixtures, comprising a body portion having inlet and outlet openings and a clean-out opening; and a clean-out plug having a spaced, disc-shaped, depending baffle offset in the direction of said outlet opening in the path of fluid passing thereto.

HENRY J. LUFF.